United States Patent
Sharma et al.

(10) Patent No.: US 12,101,253 B2
(45) Date of Patent: *Sep. 24, 2024

(54) CONTAINER NETWORKING INTERFACE FOR MULTIPLE TYPES OF INTERFACES

(71) Applicant: Juniper Networks, Inc., Sunnyvale, CA (US)

(72) Inventors: Shailender Sharma, Bangalore (IN); Yuvaraja Mariappan, San Jose, CA (US); Rakesh Kumar Reddy Varimalla, Bengaluru (IN); Jude Pragash Vedam, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,442

(22) Filed: Jun. 30, 2023

(65) Prior Publication Data

US 2023/0344757 A1 Oct. 26, 2023

Related U.S. Application Data

(63) Continuation of application No. 17/455,196, filed on Nov. 16, 2021, now Pat. No. 11,743,182.
(Continued)

(30) Foreign Application Priority Data

Mar. 1, 2021 (IN) .............................. 202141008464
Mar. 1, 2021 (IN) .............................. 202141008548

(51) Int. Cl.
*H04L 45/586* (2022.01)
*G06F 9/455* (2018.01)
(Continued)

(52) U.S. Cl.
CPC ........ *H04L 45/586* (2013.01); *G06F 9/45558* (2013.01); *H04L 41/046* (2013.01);
(Continued)

(58) Field of Classification Search
CPC ....... G06F 2009/45595; G06F 9/45558; H04L 41/046; H04L 41/0803; H04L 41/0893;
(Continued)

(56) References Cited

U.S. PATENT DOCUMENTS 9,571,394 B1 2/2017 Sivaramakrishnan et al.
9,942,148 B1 4/2018 Sivaramakrishnan et al.
(Continued)

FOREIGN PATENT DOCUMENTS

CN 110875844 A 3/2020
CN 110875848 A 3/2020
(Continued)

OTHER PUBLICATIONS

First Office Action and Search Report, and translation thereof, from counterpart Chinese Application No. 202210044818.8 dated Sep. 16, 2023, 29 pp.
(Continued)

*Primary Examiner* — Alina A Boutah
(74) *Attorney, Agent, or Firm* — Shumaker & Sieffert, P.A.

(57) ABSTRACT

In general, techniques are described for a computing device including a virtual router, a pod comprising a container, and a network plugin. The virtual router includes a virtual router agent. The network plugin includes processing circuitry configured to receive, from the virtual router agent, an indication of an interface type for a virtual network for the pod and to configure, for the pod, a virtual network interface having the interface type, the virtual network interface for communicating on the virtual network.

20 Claims, 7 Drawing Sheets

Related U.S. Application Data

(60) Provisional application No. 63/242,434, filed on Sep. 9, 2021.

(51) Int. Cl.
  *H04L 41/046* (2022.01)
  *H04L 41/0893* (2022.01)
  *H04L 45/64* (2022.01)

(52) U.S. Cl.
  CPC .......... *H04L 41/0893* (2013.01); *H04L 45/64* (2013.01); *G06F 2009/45595* (2013.01)

(58) Field of Classification Search
  CPC ... H04L 41/0886; H04L 45/586; H04L 45/64; H04L 12/02; H04L 12/4641; H01R 27/00
  See application file for complete search history.

(56) References Cited

U.S. PATENT DOCUMENTS

| | | | |
|---|---|---|---|
| 10,708,082 | B1 | 7/2020 | Bakiaraj et al. |
| 10,728,145 | B2 | 7/2020 | Rao et al. |
| 10,855,531 | B2 | 12/2020 | Vaidya et al. |
| 11,743,182 | B2 | 8/2023 | Sharma et al. |
| 2018/0101396 | A1 | 4/2018 | Singh et al. |
| 2020/0073692 | A1 | 3/2020 | Rao et al. |
| 2020/0076685 | A1 | 3/2020 | Vaidya et al. |
| 2020/0112487 | A1 | 4/2020 | Inamdar et al. |
| 2022/0038501 | A1 | 2/2022 | Shen et al. |
| 2022/0278926 | A1 | 9/2022 | Sharma et al. |
| 2022/0278927 | A1 | 9/2022 | Mariappan et al. |
| 2022/0279420 | A1 | 9/2022 | Akkipeddi et al. |

FOREIGN PATENT DOCUMENTS

| | | | | |
|---|---|---|---|---|
| CN | 111147297 | A | 5/2020 | |
| CN | 111371627 | A | 7/2020 | |
| CN | 111371696 | A | 7/2020 | |
| CN | 111796905 | A * | 10/2020 | ......... G06F 9/45558 |
| CN | 111857873 | A | 10/2020 | |
| CN | 111880902 | A | 11/2020 | |
| CN | 112202615 | A | 1/2021 | |
| CN | 112291094 | A | 1/2021 | |
| EP | 3617879 | A1 | 3/2020 | |
| EP | 3617880 | A1 | 3/2020 | |
| EP | 3716533 | A1 | 9/2020 | |
| WO | 2013184846 | A1 | 12/2013 | |

OTHER PUBLICATIONS

"Knitter," ZTE repository, Github, Accessed: May 8, 2021 from: https://web.archive.org/web/20210508054430/https://github.com/ZTE/Knitter/, last comment by guangxuli on Sep. 15, 2020, 5 pp.

"SR-IOV CNI plugin," hustcat repository, Github, Accessed: Jun. 15, 2021 from: https://web.archive.org/web/20210615092449/https://github.com/hustcat/sriov-cni, last comment by yuzhiquan and hustcat on Mar. 27, 2020, 5 pp.

Extended Search Report from counterpart European Application No. 22151632.1 dated Jun. 27, 2022, 11 pp.

Mackie et al., "BGP-Signaled End-System IP/VPNs," draft-ietf-l3vpn-end-system-06, Network Working Group, Dec. 15, 2016, 31 pp.

Prosecution History from U.S. Appl. No. 17/455,196, dated Dec. 5, 2022 through Apr. 4, 2023, 38 pp.

Response to Extended Search Report dated Jun. 27, 2022, from counterpart European Application No. 22151632.1 filed Mar. 6, 2023, 24 pp.

Sayfan, "Mastering Kubernetes", Automating container deployment and management, Packt Publishing Ltd., Jan. 2017, 400 pp.

Communication pursuant to Article 94(3) EPC from counterpart European Application No. 22151632.1 dated Feb. 1, 2024, 5 pp.

Second Office Action, and translation thereof, from counterpart Chinese Application No. 202210044818.8 dated Mar. 29, 2024, 23 pp.

Notice of Intent to Grant from counterpart Chinese Application No. 202210044818.8 dated Jun. 21, 2024, 7 pp.

Park et al., "Performance Analysis of CNI (Container Networking Interface) based Container Network," 2018 International Conference on Information and Communication Technology Convergence (ICTC), Oct. 2018, pp. 248-250.

Response to Communication pursuant to Article 94(3) EPC dated Feb. 1, 2024, from counterpart European Application No. 22151632.1 filed May 31, 2024, 10 pp.

* cited by examiner

CONTAINER NETWORKING INTERFACE FOR MULTIPLE TYPES OF INTERFACES

CROSS REFERENCE TO OTHER APPLICATIONS

This application is a continuation of U.S. patent application Ser. No. 17/455,196, filed 16 Nov. 2021, which claims the benefit of U.S. Provisional Patent Application No. 63/242,434, filed 9 Sep. 2021; India Provisional Patent Application No. 202141008548, filed 1 Mar. 2021; and India Provisional Patent Application No. 202141008464, filed 1 Mar. 2021; the entire content of each application is incorporated herein by reference.

TECHNICAL FIELD

The disclosure relates to virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, this disclosure describes techniques for a container networking interface (CNI) that supports multiple types of virtual network interfaces. Types of virtual network interfaces may include, for example, virtual ethernet ("veth"), a single root I/O virtualization (SR-IOV) VF, Virtio, or another type of virtual interface. A CNI plugin is a networking solution for application containers and is a runtime executable that assists with configuring virtual network interfaces (also referred to herein as simply "virtual interfaces" or "interfaces") for network communications between pods that include the container and other components of the computing device ("host") hosting the pod. The computing device may be alternatively referred to as a "compute node" or "server". The CNI plugin (also referred to herein as simply "CNI") may assign the network address (e.g., IP address) to the interface and may also add routes relevant for the interface, such as routes for the default gateway and one or more nameservers.

Techniques described herein may involve a CNI plugin (also referred to herein as a "network plugin") enhanced to support attaching, to a pod, virtual network interfaces having different virtual network interface types. For example, a pod manifest may be extended to specify a virtual network interface type to be used when attaching, for a particular virtual network, a virtual network interface to a pod. The pod manifest may specify multiple, and in some cases different virtual network interfaces types for multiple virtual networks to be set up for the pod. The CNI plugin can accommodate the different virtual network interface types and attach virtual interfaces to the pod according to type, based on the pod manifest. In some examples, a common network attachment definition for a virtual network may specify a single IP subnet from which IP addresses of the virtual network should be drawn. Because the single CNI plugin can accommodate different virtual network interface types, different network attachment definitions for multiple CNIs need not be specified, and the CNI plugin can draw from the single IP subnet specified in the common network attachment definition.

The techniques may provide one or more technical advantages. For example, a CNI plugin described herein may support multiple virtual network interface types without requiring the host to execute separate, independent CNI plugins that have been specifically designed for each of the different virtual network interface types and without recourse to a meta-CNI plugin (e.g., MULTUS or other third party CNI plugin) required to manage such multiple independent CNI plugins. As another example, a CNI plugin described herein may assign IP addresses to different types of virtual interfaces from the same IP address management (IPAM) plugin using a common network attachment definition for the virtual network interfaces (in some cases having different virtual network interface types). Even though different pod manifests may specify the same virtual network but different virtual network interface types, the single CNI with the common network attachment definition may facilitate unified IP address management and reduce address conflict that otherwise occur with separate CNIs and corresponding, separate network attachment definitions.

In one example, this disclosure describes a computing device comprising a virtual router, a pod, and a network plugin. The virtual router comprises a virtual router agent. The virtual router comprises processing circuitry. The pod comprises a container. The network plugin comprises processing circuitry and is configured to receive, from the virtual router agent, an indication of an interface type for a virtual network for the pod and configure, for the pod, a virtual network interface having the interface type, the virtual network interface for communicating on the virtual network.

In another example, this disclosure describes a system comprising a network controller and a host computing device. The network controller is for a virtualized computing infrastructure. The network controller comprises processing circuitry. The host computing device comprises a virtual router, a virtual router agent for the virtual router, and a network plugin. The network controller is configured to receive a request to configure a pod, deployed to the host computing device, with a virtual network interface of an interface type specified in the request. The network controller is configured to send, to the virtual router agent, interface configuration data specifying the interface type specified in the request. The network plugin is configured to receive, from the virtual router agent, an indication of an interface type for a virtual network for the pod and to configure, for the pod, a virtual network interface having the interface type.

In another example, this disclosure describes a method comprising receiving, by a network plugin comprising processing circuitry, an indication of an interface type for a virtual network for a pod from a virtual router agent of a virtual router, the virtual router comprising processing circuitry and configuring, by the network plugin, for the pod, a virtual network interface having the interface type, the virtual network interface for communicating on the virtual network.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
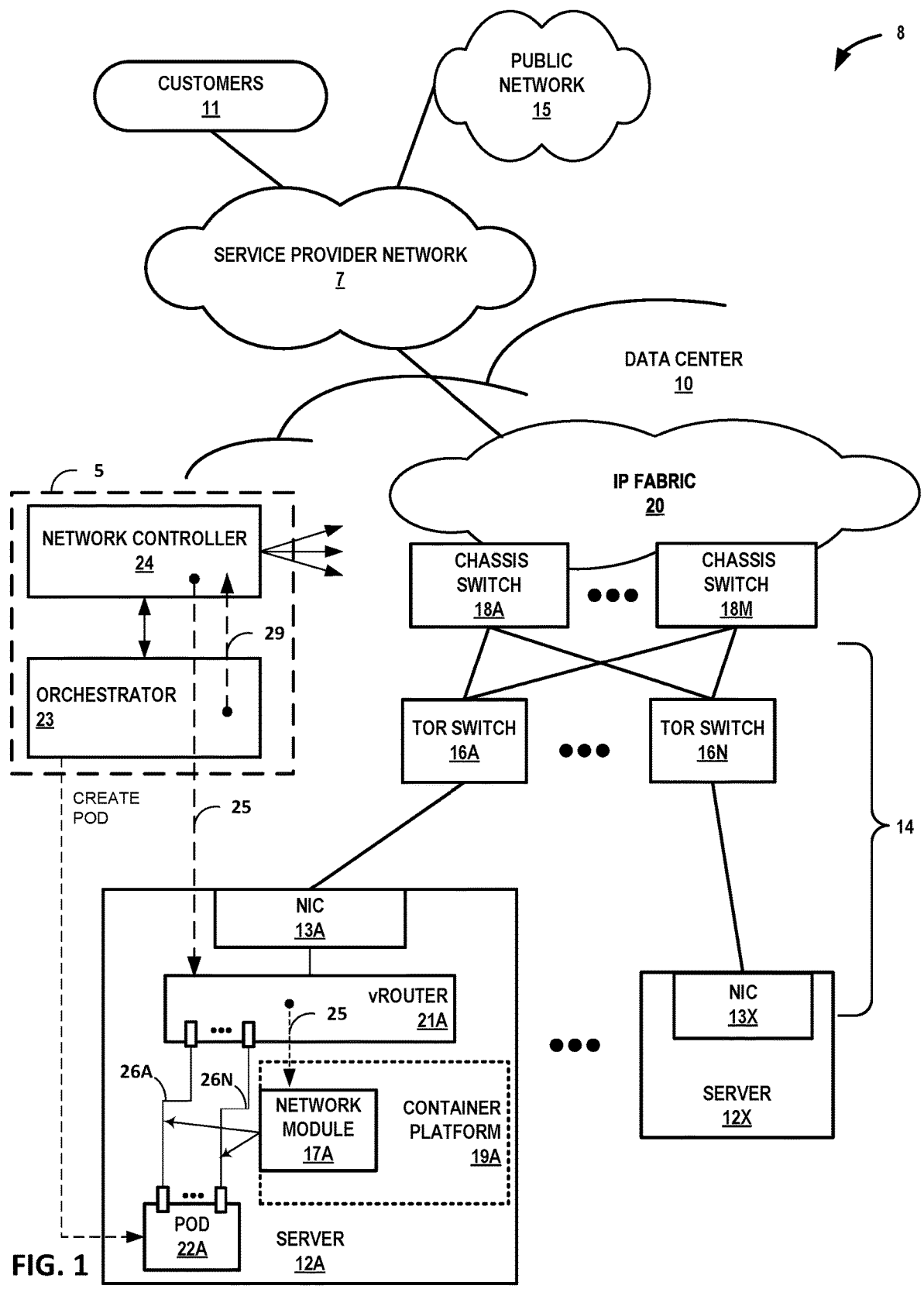
FIG. 1 is a block diagram illustrating an example computing infrastructure in which examples of the techniques described herein may be implemented.

FIG. 1 is a block diagram illustrating an example computing infrastructure 8 in which examples of the techniques described herein may be implemented. In general, data center 10 provides an operating environment for applications and services for a customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users.

Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a data center 10 edge router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e. which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application, CRI-o, Container runtimes, or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O may be a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets.

For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

Kubernetes operates using a variety of "objects"—entities which represent a state of a Kubernetes cluster. Kubernetes objects may include any combination of names, namespaces, labels, annotations, field selectors, and recommended labels. For example, a Kubernetes cluster may include one or more "namespace" objects. In some cases, each namespace of a Kubernetes cluster is isolated from other namespaces of the Kubernetes cluster. Namespace objects may improve at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating with a common set of characteristics. A namespace can be created according to namespace specification data that defines characteristics of the namespace, including a namespace name. In one example, a namespace is named "my-namespace" and each newly-created pod may be associated with a set of characteristics denoted by "my-namespace." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. The techniques of this disclosure include an ability to associate multiple virtual networks with a single namespace. As such, a user within the respective namespace has the ability to access each virtual network of the virtual networks that is associated with the namespace, including virtual execution elements that serve as virtual network endpoints of the group of virtual networks.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Network module 17A may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. Network module 17A may assign a network address (e.g., a virtual IP address for the virtual network) and may setup routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

As part of the process of creating pod 22A, orchestrator 23 sends request 29 to request that network controller 24 create respective virtual network interfaces for the multiple virtual networks (indicated in the configuration data). Orchestrator 23 may store, send to, or other notify network controller 24 of virtual network configuration objects for the multiple virtual networks specified for pod 22A. For example, orchestrator 23 may obtain a pod manifest that includes an annotation indicating an interface type for a virtual network for pod 22A and deploy pod 22A to a host computing device. In this example, orchestrator 23 may store pod configuration data (e.g., virtual network configuration objects for the multiple virtual networks specified for pod 22A) for pod 22A. The pod configuration data may include the interface type for the virtual network for the pod. The pod configuration data may determine the interface type specified in the request to configure pod 22A. Network controller 24 may configure any virtual networks not already configured in the computing infrastructure 8.

Network controller 24 processes request 29 to generate interface configuration data 25 for the multiple virtual network interfaces 26 for pod 22A for communicating via the virtual networks indicated in the namespace specification data 27, the virtual execution element specification data, or both. Interface configuration data 25 may include a container or pod unique identifier and a list or other data structure specifying, for each of virtual network interface 26, network configuration data for configuring the virtual network interface. Network configuration data for a virtual network interface may include a network name, assigned virtual network address, MAC address, and/or domain name server values. An example of network configuration data in JSON format is below. The multiple virtual network interfaces 26 correspond, respectively, to the multiple virtual networks. Network controller 24 sends interface configuration data 25 to server 12A and, more specifically in some cases, to virtual router 21A. To configure one or more virtual network interfaces for pod 22A, container platform 19A invokes a single instance of network module 17A. The network module 17A obtains and processes the interface configuration data 25. For each virtual network interface specified in the interface configuration data 25, the network module 17A creates one of virtual network interfaces 26. For example, network module 17A may attach one end of a veth pair implementing virtual network interface 26A to virtual router 21A and may attach the other end of the same veth pair to pod 22A. Similarly, network module 17A may attach one end of a veth pair implementing virtual network interface 26N to virtual router 21A and may attach the other end of the same veth pair to pod 22A. In this way, a single instance of network module 17A configures multiple virtual network interfaces 26 for one or more virtual execution element that share at least one virtual network interface, in this case pod 22A.

The following is example network configuration data for pod 22A for a single virtual network interface 26A:

```
apiVersion: "k8s.cni.cncf.io/v1"
kind: NetworkAttachmentDefinition
metadata:
    name: nasa-nad1
    namespace: nasa-nad
    annotations:
        juniper.net/networks: '{
            "ipamV4Subnet": "172.16.70.0/24"
            "routeTargetList": ["target:23:4561"],
            "importRouteTargetList": ["target:2.2.2.2:561"],
            "exportRouteTargetList": ["target:1.1.1.1:561"]
        }'
spec:
    config: '{
    "cniVersion": "0.3.1",
    "name": "nasa-nad1"
    "type": "contrail-k8s-cni"
    }'
```

The following is example pod yaml for pod 22A for a single virtual network interface 26A. Interface-type if not specified via cni-args may be "veth" by default.

```
apiVersion: v1
kind: Pod
metadata:
    name: nasa-nad-pod-1
    namespace: test-nad
    annotations:
        k8s.v1.cni.cncf.io/networks: '[{"name":"nasa-nad1",
            "namespace":"nasa-
nad","cni-
args":null,"ips":["172.16.70.3"],"mac":"de:ad:00:00:be:ef",
"interface":"intf"}]'
```

Network configuration data for pod 22A may include multiple similar annotations as that provided above for multiple different virtual network interfaces 26. For example, orchestrator 23 may obtain a pod manifest that includes an annotation indicating an interface type for a virtual network for pod 22A and deploy pod 22A to a host computing device. In this example, orchestrator 23 may store pod configuration data (e.g., the example network configuration data for pod 22A for a single virtual network interface 26A) for pod 22A. The pod configuration data may include the interface type for the virtual network for the pod. The pod configuration data may determine the interface type specified in the request to configure pod 22A.

A conventional CNI plugin is invoked by a container platform/runtime, receives an Add command from the container platform to add a container to a single virtual network, and such a plugin is then maintained in the runtime memory of the server to subsequently receive a Del(ete) command from the container/runtime and remove the container from the virtual network. This may rely on a separate CNI plugins per virtual network. A single network module 17A invoked by container platform 19A extends the functionality of a conventional CNI plugin by obtaining interface configuration data 25 and adding multiple different virtual network interfaces 26. The term "invoke" may refer to the instantiation, as executable code, of a software component or module in memory (e.g., user space 245) for execution by microprocessor 210. In some cases, however, multiple instances of network modules 17A may be invoked to configure the virtual network interfaces 26.

Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks.

In Kubernetes environment, pod 22A may represent the workload that implements useful functions. In a high performance, containerized telecommunications workloads environment such as 5G, pod 22A may use multiple types of interfaces such as DPDK, Smart NIC and SRIOV directly made available to pod 22A. Network module 17A may provide the network interfaces (e.g., virtual interfaces) to pod 22A.

In some systems, every network plugin that is available from various vendors supports only one specific type of interface. In such systems, pod 22A would use multiple different types of network plugins for each interface type and a meta CNI such as Multus for integrating all to work together. In this example, IP Addresses are managed on a per-CNI-basis using individual network attachment definitions, which may cause an increase in complexity of use as each CNI plugin is implemented by a different vendor which may be subject to different versioning, updating, and/or debugging. Moreover, creating connectivity between different types of interfaces may cause complex network configurations at least because the CNIs may be configured with independent network attachment definitions and/or independent IPAM.

For example, in a given Kubernetes cluster, a first CNI manages veth and a second CNI manages DPDK, where the first CNI and the second CNI each use respective network attachment definitions and different IP address ranges. Providing connectivity between the veth interface of a Pod1 to DPDK interface of Pod2 has a higher complexity due to the different network attachment definitions and different IP address ranges. Providing such connectivity requires complex routing by the overlay network provider.

Techniques described herein may relates to one or more of: (a) providing multiple interface types to a pod using one CNI that can accommodate requests for interfaces having multiple different virtual network interface types; or (b) providing a unified IPAM to allocate IP from the same subnet range across multiple interface types, hence reducing the complexity in configuration and reducing likelihood of IP address conflicts due to a misconfiguration.

In accordance with the techniques of the disclosure, network module 17A may be enhanced to support attaching, to a pod, virtual network interfaces that may be any of multiple different virtual network interface types, without the use of a Multus CNI or any other third party CNI plugins. For example, network module 17A can assign IP addresses to different types of virtual network interfaces from the same IPAM using one network attachment definition.

Figure 2:
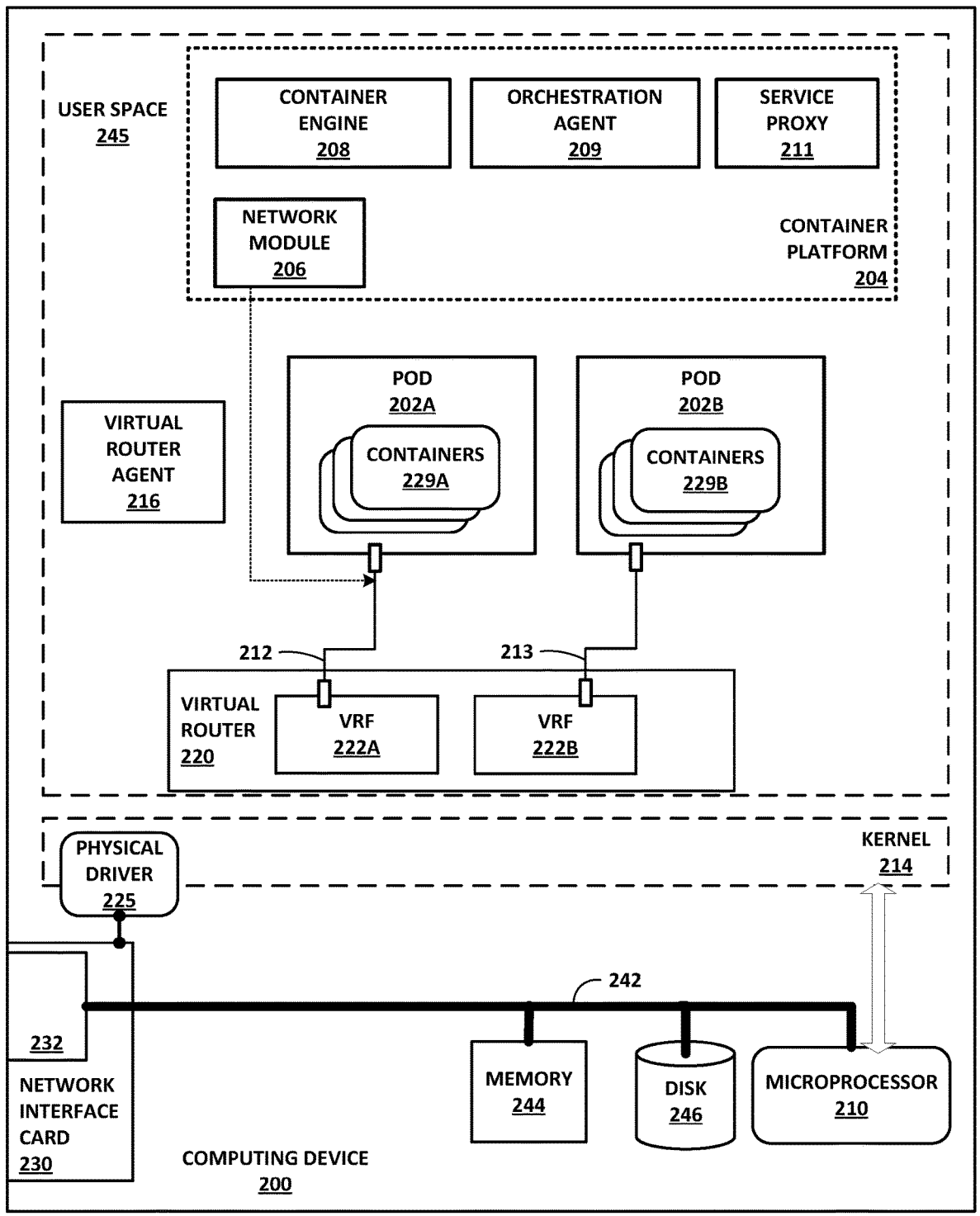
FIG. 2 is a block diagram of an example computing device (e.g., host) that includes a network module for configuring virtual network interfaces for a set of one or more virtual execution elements, according to techniques described in this disclosure.

FIG. 2 is a block diagram of an example computing device (e.g., host) that includes a network module for configuring virtual network interfaces for a set of one or more virtual execution elements, according to techniques described in this disclosure. Computing device 200 of FIG. 2 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A front-side bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 214 executing in kernel space. Kernel 214 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 214 provides an execution environment for one or more processes in user space 245.

Kernel 214 includes a physical driver 225 to use the network interface card 230. Network interface card 230 may also implement SR-IOV to enable sharing the physical network function (I/O) among one or more virtual execution elements, such as containers 229A-229B or one or more virtual machines (not shown in FIG. 2). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 220 executes within user space as a DPDK-based virtual router, but virtual router 220 may execute within a hypervisor, a host operating system, a host application, or a virtual machine in various implementations.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing.

Virtual router 220 can be executing as a kernel module or as a user space DPDK process (virtual router 220 is shown here in user space 245). Virtual router agent 216 may also be executing in user space. In the example computing device 200 of FIG. 2, virtual router 220 executes within user space as a DPDK-based virtual router, but virtual router 220 may execute within a hypervisor, a host operating system, a host application, or a virtual machine in various implementations. Virtual router agent 216 has a connection to network controller 24 using a channel, which is used to download configurations and forwarding information. Virtual router agent 216 programs this forwarding state to the virtual router data (or "forwarding") plane represented by virtual router 220. Virtual router 220 and virtual router agent 216 may be processes.

Virtual router 220 may replace and subsume the virtual routing/bridging functionality of the Linux bridge/OVS module that is commonly used for Kubernetes deployments of pods 202. Virtual router 220 may perform bridging (e.g., E-VPN) and routing (e.g., L3VPN, IP-VPNs) for virtual networks. Virtual router 220 may perform networking services such as applying security policies, NAT, multicast, mirroring, and load balancing.

Virtual router 220 may be multi-threaded and execute on one or more processor cores. Virtual router 220 may include multiple queues. Virtual router 220 may implement a packet processing pipeline. The pipeline can be stitched by the virtual router agent 216 from the simplest to the most complicated manner depending on the operations to be applied to a packet. Virtual router 220 may maintain multiple instances of forwarding bases. Virtual router 220 may access and update tables using RCU (Read Copy Update) locks.

To send packets to other compute nodes or switches, virtual router 220 uses one or more physical interfaces 232. In general, virtual router 220 exchanges overlay packets with workloads, such as VMs or pods 202 (in FIG. 2). Virtual router 220 has multiple virtual network interfaces (e.g., vifs). These interfaces may include the kernel interface, vhost0, for exchanging packets with the host operating system; an interface with virtual router agent 216, pkt0, to obtain forwarding state from the network controller and to send up exception packets. There may be one or more virtual network interfaces corresponding to the one or more physical network interfaces 232.

Other virtual network interfaces of virtual router 220 are for exchanging packets with the workloads. Virtual network interfaces 212, 213 of virtual router 220 are illustrated in FIG. 2. Virtual network interfaces 212, 213 may be any of the aforementioned types of virtual interfaces. In some cases, virtual network interfaces 212, 213 are tap interfaces. In some examples, any of virtual network interfaces 213, 213 may be SR-IOV interfaces that bypass virtual router 220.

In a kernel-based deployment of virtual router 220 (not shown), virtual router 220 is installed as a kernel module inside the operating system. Virtual router 220 registers itself with the TCP/IP stack to receive packets from any of the desired operating system interfaces that it wants to. The interfaces can be bond, physical, tap (for VMs), veth (for containers) etc. Virtual router 220 in this mode relies on the operating system to send and receive packets from different interfaces. For example, the operating system may expose a tap interface backed by a vhost-net driver to communicate with VMs. Once virtual router 220 registers for packets from this tap interface, the TCP/IP stack sends all the packets to it. Virtual router 220 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 220 (shown in FIG. 2), virtual router 220 is installed as a user space 245 application that is linked to the DPDK library. This may lead to faster performance than a kernel-based deployment, particularly in the presence of high packet rates. The physical interfaces 232 are used by the poll mode drivers (PMDs) of DPDK rather the kernel's interrupt-based drivers. The registers of physical interfaces 232 may be exposed into user space 245 in order to be accessible to the PMDs; a physical interface 232 bound in this way is no longer managed by or visible to the host operating system, and the DPDK-based virtual router 220 manages the physical interface 232. This includes packet polling, packet processing, and packet forwarding. In other words, user packet processing steps are performed by the virtual router 220 DPDK data plane. The nature of this "polling mode" makes the virtual router 220 DPDK data plane packet processing/forwarding much more efficient as compared to the interrupt mode when the packet rate is high. There are comparatively few interrupts and context switching during packet I/O, compared to kernel-mode virtual router 220, and interrupt and context switching during packet I/O may in some cases be avoided altogether.

In general, each of pods 202A-202B may be assigned one or more virtual network addresses for use within respective virtual networks, where each of the virtual networks may be associated with a different virtual subnet provided by virtual router 220. Pod 202B may be assigned its own virtual layer three (L3) IP address, for example, for sending and receiving communications but may be unaware of an IP address of the computing device 200 on which the pod 202B. The virtual network address may thus differ from the logical address for the underlying, physical computer system, e.g., computing device 200.

Computing device 200 includes a virtual router agent 216 that controls the overlay of virtual networks for computing device 200 and that coordinates the routing of data packets within computing device 200. In general, virtual router agent 216 communicates with network controller 24 for the virtualization infrastructure, which generates commands to create virtual networks and configure network virtualization endpoints, such as computing device 200 and, more specifically, virtual router 220, as a well as virtual network interface 212. By configuring virtual router 220 based on information received from network controller 24, virtual router agent 216 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A-229B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 220 performs tunnel encapsulation/decapsulation for packets sourced by/destined to any containers of pods 202, and virtual router 220 exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 220 implements one or more virtual routing and forwarding instances (VRFs) 222A-222B for respective virtual networks for which virtual router 220 operates as respective tunnel endpoints. In general, each VRF 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of VRFs 222 may include a network forwarding table storing routing and forwarding information for the virtual network.

NIC 230 may receive tunnel packets. Virtual router 220 processes the tunnel packet to determine, from the tunnel encapsulation header, the virtual network of the source and destination endpoints for the inner packet. Virtual router 220 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to pod 202A in response.

Containers 229A-229B may also source inner packets as source virtual network endpoints. Container 229A, for instance, may generate a layer 3 inner packet destined for a destination virtual network endpoint that is executed by another computing device (i.e., not computing device 200) or for another one of containers 229A-229B. Container 229A sends the layer 3 inner packet to virtual router 220 via virtual network interface 212 attached to VRF 222A.

Virtual router 220 receives the inner packet and layer 2 header and determines a virtual network for the inner packet. Virtual router 220 may determine the virtual network using any of the above-described virtual network interface implementation techniques (e.g., macvlan, veth, etc.). Virtual router 220 uses the VRF 222A corresponding to the virtual network for the inner packet to generate an outer header for the inner packet, the outer header including an outer IP header for the overlay tunnel and a tunnel encapsulation header identifying the virtual network. Virtual router 220 encapsulates the inner packet with the outer header. Virtual router 220 may encapsulate the tunnel packet with a new layer 2 header having a destination layer 2 address associated with a device external to the computing device 200, e.g., a TOR switch 16 or one of servers 12. If external to computing device 200, virtual router 220 outputs the tunnel packet with the new layer 2 header to NIC 230 using physical function 221. NIC 230 outputs the packet on an outbound interface. If the destination is another virtual network endpoint executing on computing device 200, virtual router 220 routes the packet to the appropriate one of virtual network interfaces 212, 213.

In some examples, a controller for computing device 200 (e.g., network controller 24 of FIG. 1) configures a default route in each of pods 202 to cause the virtual machines 224 to use virtual router 220 as an initial next hop for outbound packets. In some examples, NIC 230 is configured with one or more forwarding rules to cause all packets received from virtual machines 224 to be switched to virtual router 220.

Pods 202A-202B may represent example instances of pod 22A of FIG. 1, in further detail. Pod 202A includes one or more containers 229A, and pod 202B includes one or more containers 229B.

Container platform 204 may represent an example instance of container platform 19A of FIG. 1, in further detail. Container platform 204 include container runtime 208, orchestration agent 209, service proxy 211, and network module 206. Network module 206 may represent an example instance of network module 17A of FIG. 1.

Container engine 208 includes code executable by microprocessor 210. Container runtime 208 may be one or more computer processes. Container engine 208 runs containerized applications in the form of containers 229A-229B. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 209, container engine 208 may obtain images and instantiate them as executable containers 229A-229B in pods 202A-202B.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 220 and pods 202 by network modules 206.

Orchestration agent 209 includes code executable by microprocessor 210. Orchestration agent 209 may be one or more computer processes. Orchestration agent 209 may represent a kubelet for a minion node of a Kubernetes cluster. Orchestration agent 209 is an agent of an orchestrator, e.g., orchestrator 23 of FIG. 1, that receives container specification data for containers and ensures the containers execute by computing device 200. Container specification data may be in the form of a manifest file sent to orchestration agent 209 from orchestrator 23 or indirectly received via a command line interface, HTTP endpoint, or HTTP server. Container specification data may be a pod specification (e.g., a PodSpec-a YAML (Yet Another Markup Language) or JSON object that describes a pod) for one of pods 202 of containers 229. Based on the container specification data, orchestration agent 209 directs container engine 208 to obtain and instantiate the container images for containers 229, for execution of containers 229 by computing device 200.

Orchestration agent 209 instantiates network module 206 to configure one or more virtual network interfaces for each of pods 202. Network modules 206 may represent an example instance of network module 17A of FIG. 1. For example, orchestration agent 209 receives a container specification data for pod 202A and directs container engine 208 to create the pod 202A with containers 229A based on the container specification data for pod 202A. Orchestration agent 209 also invokes the network module 206 to configure, for pod 202A, virtual network interface 212 for a virtual network corresponding to VRFs 222A. In this example, pod 202A and pod 202B are virtual network endpoints for the virtual networks corresponding to VRF 22A and VRF 22B. Any of virtual network interfaces 212, 213 may represent an example instance of one of virtual network interfaces 26 described in FIG. 1.

Network module 206 may obtain interface configuration data for configuring virtual network interfaces for pods 202. Virtual router agent 216 operates as a virtual network control plane module for enabling network controller 24 to configure virtual router 220. Unlike the orchestration control plane (including the container platforms 204 for minion nodes and the master node(s), e.g., orchestrator 23), which manages the provisioning, scheduling, and managing virtual execution elements, a virtual network control plane (including network controller 24 and virtual router agent 216 for minion nodes) manages the configuration of virtual networks implemented in the data plane in part by virtual routers 220 of the minion nodes. Virtual router agent 216 communicates, to network module 206, interface configuration data for virtual network interfaces to enable an orchestration control plane element (i.e., network module 206) to configure the virtual network interfaces according to the configuration state determined by the network controller 24, thus bridging the gap between the orchestration control plane and virtual network control plane. In addition, this may enable a network module 206 to obtain interface configuration data for multiple virtual network interfaces for a pod and configure the multiple virtual network interfaces, which may reduce communication and resource overhead inherent with invoking a separate network module 206 for configuring each virtual network interface.

Figure 3:
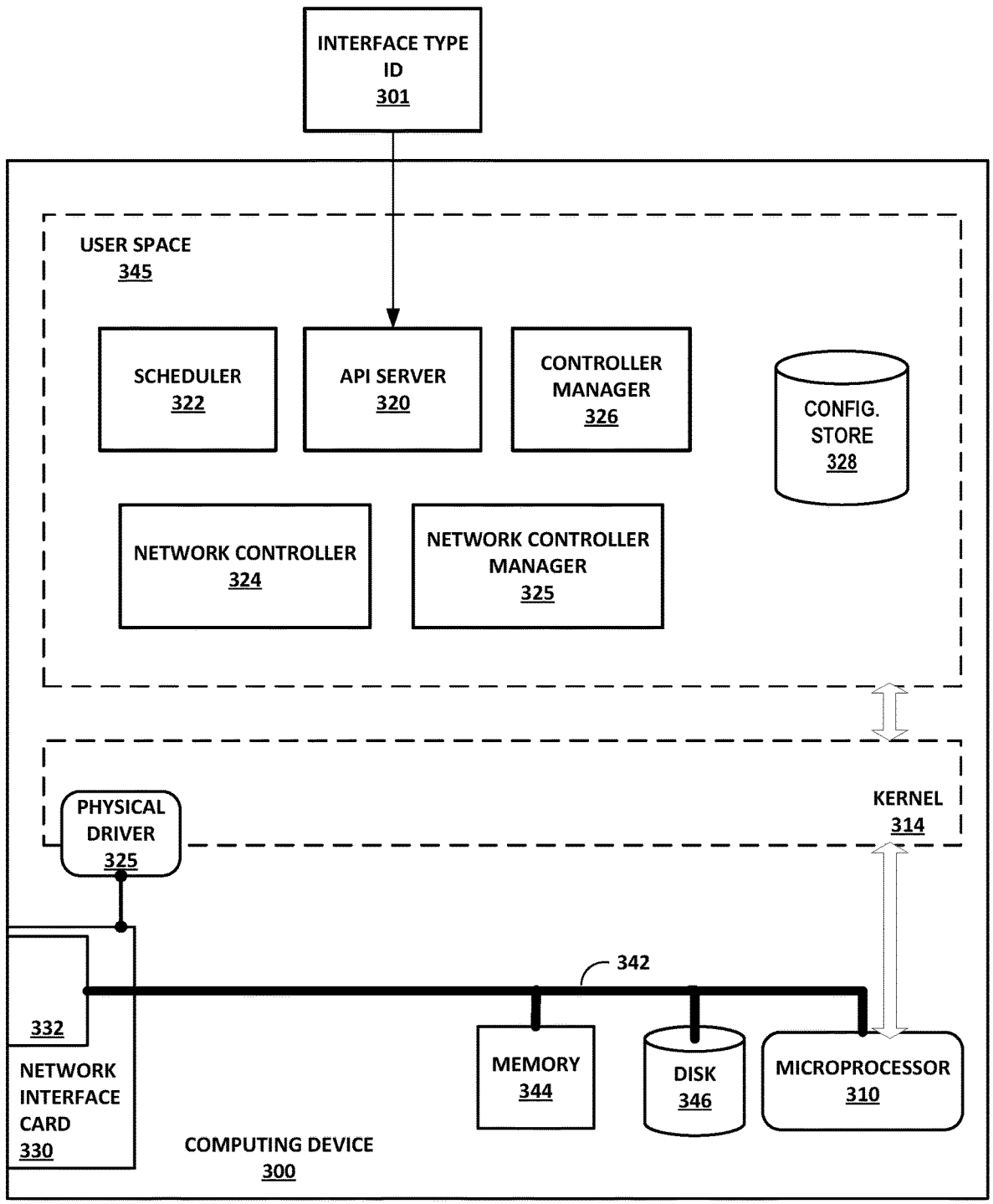
FIG. 3 is a block diagram of an example computing device operating as an instance of a controller for a virtualized computing infrastructure, according to techniques described in this disclosure.

FIG. 3 is a block diagram of an example computing device operating as an instance of controller for a virtualized computing infrastructure. Computing device 300 an example instance of controller 5 for a virtualized computing infrastructure. Computing device 300 of FIG. 3 may represent one or more real or virtual servers configured to perform operations for at least one of a network controller 24 and an orchestrator 23. As such, computing device 300 may in some instances implement one or more master nodes for respective clusters.

Scheduler 322, API server 320, network controller manager 326, network controller 324, network controller manager 325, and configuration store 328, although illustrated and described as being executed by a single computing device 300, may be distributed among multiple computing devices 300 that make up a computing system or hardware/server cluster. Each of the multiple computing devices 300, in other words, may provide a hardware operating environment for one or more instances of any one or more of scheduler 322, API server 320, network controller manager 326, network controller 324, network controller manager 325, or configuration store 328. Network controller 324 may represent an example instance of network controller 24 of FIG. 1. Scheduler 322, API server 320, controller manager 326, and network controller manager 325 may implement an example instance of orchestrator 23. Network controller manager 325 may represent an example implementation of a Kubernetes cloud controller manager or Kube-manager. Network controller 324 may represent an example instance of network controller 24.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A frontside bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 242. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in user space 345. Kernel 314 includes a physical driver 325 to use the network interface card 230.

Computing device 300 may be coupled to a physical network switch fabric that includes an overlay network that extends switch fabric from physical switches to software or "virtual" routers of physical servers coupled to the switch fabric, such virtual router 220 of FIG. 2. Computing device 300 may use one or more dedicated virtual networks to configure minion nodes of a cluster.

API server 320, scheduler 322, controller manager 326, and configuration store may implement a master node for a cluster and be alternatively referred to as "master components." The cluster may a Kubernetes cluster and the master node a Kubernetes master node, in which case the master components are Kubernetes master components.

API server 320 includes code executable by microprocessor 310. API server 320 may be one or more computer processes. API server 320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 320 may implement a Representational State Transfer (REST) interface to process REST operations and provide the frontend to a corresponding cluster's shared state stored to configuration store 328. API server 320 may authenticate and authorize requests. API server 320 communicates with other components to instantiate virtual execution elements in the computing infrastructure 8. API server 320 may represent a Kubernetes API server.

Configuration store 328 is a backing store for all cluster data. Cluster data may include cluster state and configuration data. Configuration data may also provide a backend for service discovery and/or provide a locking service. Configuration store 328 may be implemented as a key value store. Configuration store 328 may be a central database or distributed database. Configuration store 328 may represent an etcd store. Configuration store 328 may represent a Kubernetes configuration store.

Scheduler 322 includes code executable by microprocessor 310. Scheduler 322 may be one or more computer processes. Scheduler 322 monitors for newly created or requested virtual execution elements (e.g., pods of containers) and selects a minion node on which the virtual execution elements are to run. Scheduler 322 may select a minion node based on resource requirements, hardware constraints, software constraints, policy constraints, locality, etc. Scheduler 322 may represent a Kubernetes scheduler.

In general, API server 320 may invoke the scheduler 322 to schedule a virtual execution element, which may select a minion node and returns an identifier for the selected minion node to API server 320, which may write the identifier to the configuration store 328 in association with the virtual execution element. API server 320 may invoke the orchestration agent 209 for the selected minion node, which may cause the container engine 208 for the selected minion node to obtain the virtual execution element from a storage server and create the virtual execution element on the minion node. The orchestration agent 209 for the selected minion node may update the status for the virtual execution element to the API server 320, which persists this new state to the configuration store 328. In this way, computing device 300 instantiates new virtual execution elements in the computing infrastructure 8.

Controller manager 326 includes code executable by microprocessor 310. Controller manager 326 may be one or more computer processes. Controller manager 326 may embed the core control loops, monitoring a shared state of a cluster by obtaining notifications from API Server 320. Controller manager 326 may attempt to move the state of the cluster toward the desired state. Example controllers (not shown) managed by the controller manager 326 may include a replication controller, endpoints controller, namespace controller, and service accounts controller. Controller manager 326 may perform lifecycle functions such as namespace creation and lifecycle, event garbage collection, terminated pod garbage collection, cascading-deletion garbage collection, node garbage collection, etc. Controller manager 326 may represent a Kubernetes Controller Manager for a Kubernetes cluster.

Network controller 324 includes code executable by microprocessor 310. Network controller 324 may include one or more computer processes. Network controller 324 may represent an example instance of network controller 24 of FIG. 1. The network controller 324 may be a logically centralized but physically distributed Software Defined Networking (SDN) controller that is responsible for providing the management, control, and analytics functions of a virtualized network. In particular, network controller 324 may be a logically centralized control plane and management plane of the computing infrastructure 8 and orchestrates vRouters for one or more minion nodes.

Network controller 324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

Network controller 324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

Network controller 324 programs network infrastructure elements to create virtual networks and may create interface configurations for virtual network interfaces for the virtual networks.

Additional information regarding network controller 24 operating in conjunction with other devices of data center 10 or other software-defined network is found in International Application Number PCT/US2013/044378 and in U.S. patent application Ser. No. 14/226,509, incorporated by reference above.

Network controller manager 325 includes code executable by microprocessor 310. Network controller manager 325 may be one or more computer processes. Network controller manager 325 operates as an interface between the orchestration-oriented elements (e.g., scheduler 322, API server 320, controller manager 326, and configuration store 328) and network controller 324. In general, network controller manager 325 monitors the cluster for new objects (e.g., pods and services). Network controller manager 325 may isolate pods in virtual networks and connect pods with services.

Network controller manager 325 may be executed as a container of the master node for a cluster. In some cases, using network controller manager 325 enables disabling the service proxies of minion nodes (e.g., the Kubernetes kubeproxy) such that all pod connectivity is implemented using virtual routers, as described herein.

Network controller manager 325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). Network controller manager 325 may create a network solution for the application using an interface to network controller 324 to define network objects such as virtual networks, virtual network interfaces, and access control policies. Network controller 324 may implement the network solution in the computing infrastructure by, e.g., configuring the one or more virtual network and virtual network interfaces in the virtual routers.

The following example deployment configuration for this application consists of a pod and the virtual network information for the pod:

apiVersion: v1
kind: Pod
metadata:
　name: multi-net-pod
　annotations:
　　k8s.v1.cni.cncf.io/networks: '[
　　　{"name":"red"-network,"namespace":"nasa-project",
　　　　"cni-args": {"interface-type":"virtio"}, "ips":["172.16.10.10"],
　　　　"mac":"de:ad:dd:0d:be:ef"},
　　　{"name": "blue-network", "namespace":"nasa-project",
　　　　"cni-args": {"interface-type": "veth"}, "ips":["172.16.20.10"],
　　　　"mac":"de:ad:a0:b0:be:ef"},
　　　{"name": "green-network", "namespace":"nasa-project",
　　　　"cni-args": {"interface-type": "veth"}, "ips":["172.16.30.10"],
　　　　"mac":"de:ad:aa:bb:beef"}]'

```
spec:
  containers:
  - image: busybox
    command:
      - sleep
      - "3600"
    imagePullPolicy: IfNotPresent
    name: busybox
    stdin: true
    tty: true
      restartPolicy: Always
```

Examples may be directed to a specific version for example purposes only. Techniques described herein may apply to any version (e.g., all CNI versions).

This metadata information is copied to each pod replica created by the controller manager 326. When the network controller manager 325 is notified of these pods, network controller manager 325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

In accordance with the techniques of the disclosure, API server 320 may further include an interface type identifier ("ID") 301 indicating a type of a virtual interface. Types of virtual interfaces may include, for example, virtual ethernet ("veth") virtual interface (VF), a single root I/O virtualization (SR-IOV) VF, a Virtio VF, or another type of virtual interface. For example, an administrator or management device may generate and send to API server 320 a YAML or other manifest file that includes pod specification data, including indicating interface type identifier 301. The interface type identifier 301 may be indicated in association with a virtual network to indicate a virtual network interface of the indicated type should be attached to a pod for communications on the associated virtual network. As described in further details in FIGS. 4 and 5, network plugin 206 of a host computing device, to which the orchestration components deploy the pod, may select a type of interface based on interface type identifier 301 and configure the pod with the selected type of interface, which may help to provide multiple interface types to a pod using one network plugin, which may help to reduce a complexity compared to systems using a different network plugin for each interface type.

Various components, functional units, and/or modules illustrated in FIGS. 1-3 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 4:
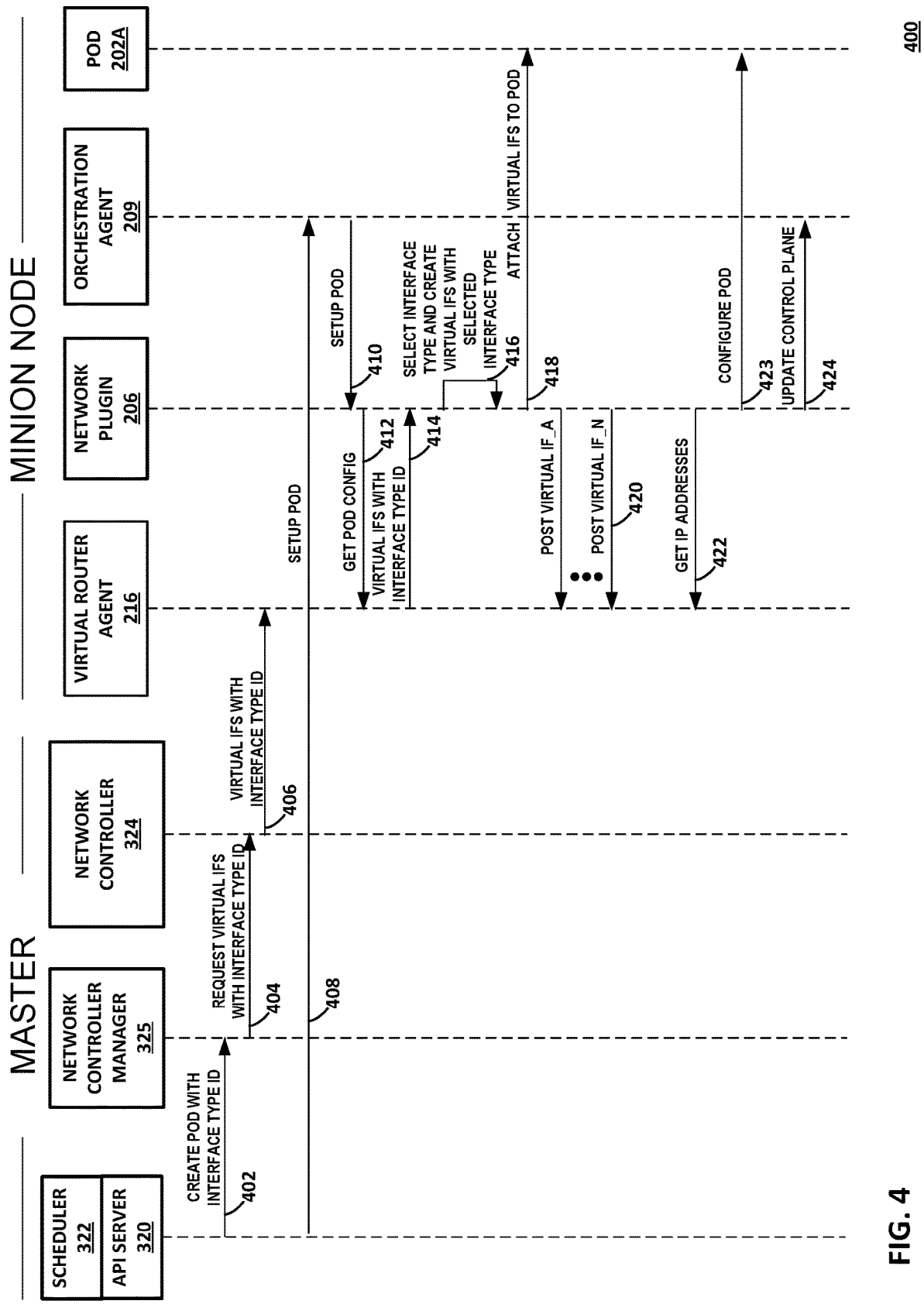
FIG. 4 is a flow diagram illustrating the example creation of network virtual interfaces for a virtual execution element using a container network interface (CNI) that supports multiple types of interfaces, according to techniques described in this disclosure.

FIG. 4 is a flow diagram illustrating one example workflow for creation of one or more network virtual interfaces for a virtual execution element using a network module, according to some aspects described in this disclosure. For purposes of example, the operations are described with respect to components of computing devices 200 and 300 of FIGS. 2-3. API server 320 receives a request to instantiate a pod 202A and modifies the configuration store 328 by generating and storing configuration information for creating the pod 202A with an interface type identifier (402). Scheduler 322 may select the computing device 200 as the host minion node for the pod 202A. API server 320 may annotate the pod 202A with a list of multiple virtual networks and an identifier for the pod (e.g., a universally unique identifier (pod_uuid), or simply a unique identifier (pod_uid)). Other forms of identifiers for the pod may be used. The annotations may be labels for the pod configuration that indicate the virtual networks, such as "virtual network A" and "virtual network B".

Network controller manager 325 listens for new objects from API server 320 and determines that pod 202A is to be instantiated on computing device 200 and determines, from the annotations, that the pod 202A requires virtual network interfaces with the multiple virtual networks indicated in the annotations. The listening may be in response to subscribing to API server 320 notifications on a RESTful interface, for example.

Network controller manager 325 directs network controller 324 to create the virtual networks and to create virtual network interfaces for the pod 202A for the virtual networks based on the interface type identifier (404). Network controller manager 325 may annotate the pods with respective uuids for the one or more virtual network interfaces (e.g, vni_uuids) to be created by network controller 324 as well as the allocated, respective unique private virtual network addresses (and in some cases MAC addresses). Other forms of identifiers for the virtual network interfaces may be used.

Network controller 324 may associate virtual network interfaces with the pod in interface configuration 25 for the pod 202A. For example, network controller 324 may create a list of virtual network interfaces for the virtual networks and may associate the vni_uuids with the pod_uuid in interface configuration data 25 for the pod 202A. The vni-uuids may be another identifier for the virtual network interfaces, such as virtual machine interface identifiers. Network controller 324 may send the interface configuration data 25 to the virtual router agent 216 for virtual router 220 of computing device 200 and configure corresponding virtual network interfaces 212 in the computing device 200 (406). Virtual router agent 216 may store an association of each vni_uuid with the corresponding configured virtual network interface.

To setup the pod 202A, orchestration agent 209 obtains container specification data for pod 202A and ensures the containers execute by computing device 200 (408). The container specification data may include the pod_uuid for pod 202A. The orchestration agent 209 invokes a network plugin 206 to configure the virtual network interfaces for the pod 202A (410). Network plugin 206 requests (412) and obtains the interface configuration data 25 with the interface type identifier from virtual router agent 216 (414). Network plugin 206 may obtain the interface configuration data 25 from virtual router agent 216 by requesting the interface configuration data for the pod corresponding to the pod_uuid included in the container specification data for pod 202A.

To create each of the virtual network interfaces 212 indicated in interface configuration data 25 with the interface type identifier (416), network plugin 206 may select an interface type based on the interface type identifier and cause an interface comprising the interface type to be created in pod 202A by passing in configuration data (418) and may make any necessary changes on the computing device 200. The configuration data in step 418 may include, e.g., MAC, DNS configuration, MTU, interface name, and vhost socket dir path and socket name for vhost control channel to DPDK application pod 202A. Types of virtual interfaces may include, for example, virtual ethernet ("veth") virtual interface (VF), a single root I/O virtualization (SR-IOV) VF, a Virtio VF, or another type of virtual interface.

Network plugin 206 notifies virtual router agent 216 of the now-operational (by virtue of configuration by pod 202A) virtual network interfaces 212 (420). Network plugin 206 may also obtain (e.g., using a GET request) the virtual network addresses (e.g., IP address (IPv4/IPv6)) from the virtual router agent 216 (422) or by invoking an appropriate IPAM plugin. Network plugin 206 may configure pod 202A (423). For example, network plugin 206 may configure pod 202A with received configuration from virtual router agent 216, such as, for example, an IP address, a MAC address, etc. For instance, network plugin 206 may configure the virtual network addresses inside the pod 202A network namespace and may setup routes by invoking the virtual router agent 216. Alternatively, network plugin 206 may configure the virtual network addresses inside the pod 202A network namespace and may setup routes consistent with the IP Address Management section by invoking an appropriate IPAM plugin. Network plugin 206 may update the orchestration control plane by notifying orchestration agent 209 (424).

Figure 5:
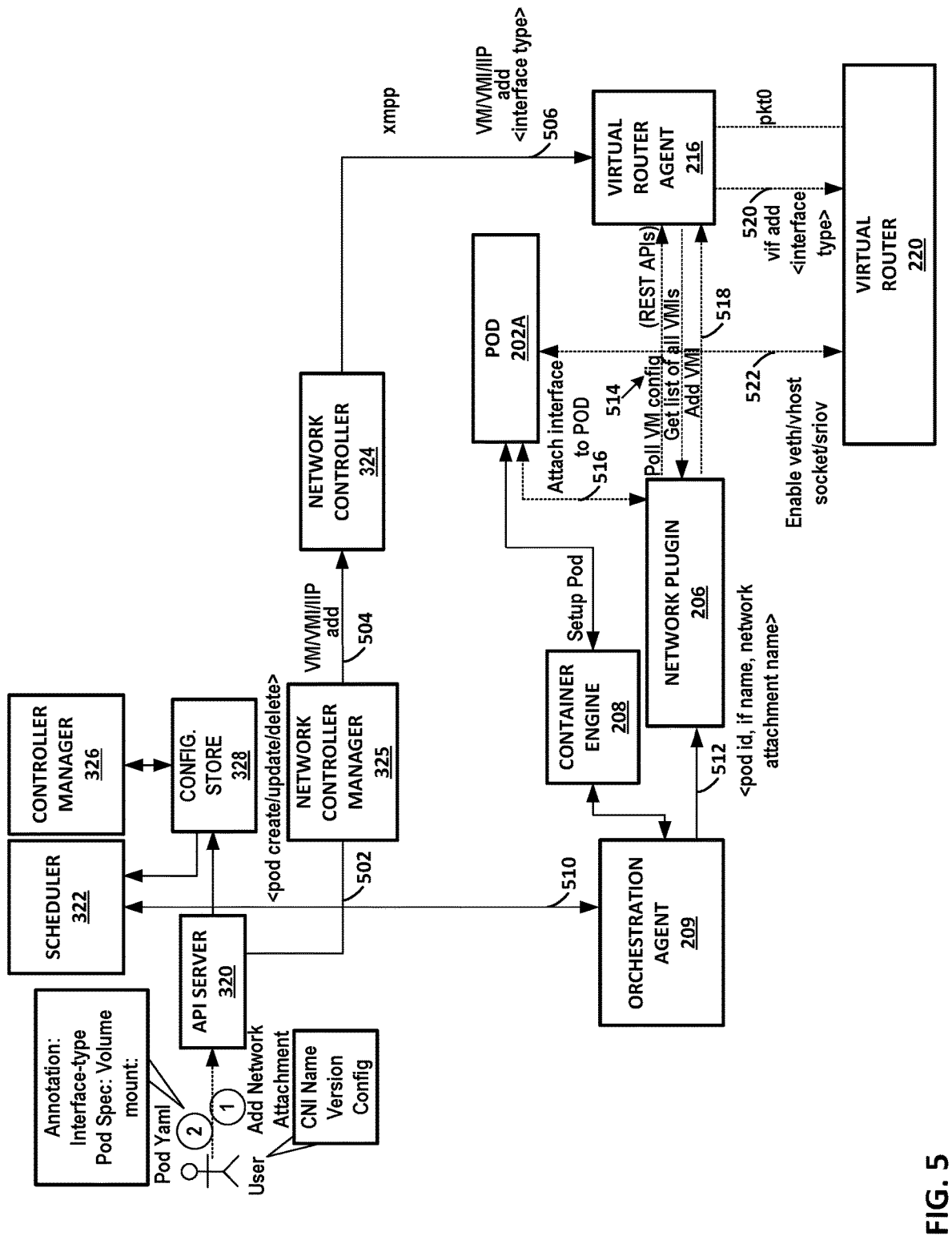
FIG. 5 is a block diagram illustrating the example creation of network virtual interfaces for a virtual execution element using a CNI that supports multiple types of interfaces, according to techniques described in this disclosure.

FIG. 5 is a block diagram illustrating the example creation of network virtual interfaces for a virtual execution element using a CNI that supports multiple types of interfaces, according to techniques described in this disclosure. FIG. 5 illustrates an overview of how orchestration and networking components may apply techniques described herein to configure virtual networking interfaces of various types. Network controller manager 325 may watch on various Kubernetes events like pod, namespace creation or deletion, and may translate the needed information into network controller objects (502). Network controller manager 325 may pass various needed pod annotations to network plugin 206 via network controller 324 and virtual router agent 216.

Network controller 324, on receiving the ADD event from network control manager 325 (504), may work with virtual router agent 216 and may receive the pod information and also various details on interfaces associated with pod 202A including basic configuration information like IP, MAC, vlan etc. (506). Other information which are specific to NIC 13A may be generated by network controller manager 325 like vhost socket name, dir, vhost mode for DPDK NICS. Network controller manager 325 may configure various interfaces like SR-IOV which may bypass virtual router 220 where pod 202A may not want to use the virtual router feature set.

To setup the pod 202A, orchestration agent 209 obtains container specification data with an interface type identifier for pod 202A and ensures the containers execute by computing device 200 (510). The container specification data may include the pod_uuid for pod 202A and <interface type>. The orchestration agent 209 invokes network plugin 206 to configure the virtual network interfaces for the pod 202A (512). Network plugin 206 requests and obtains the interface configuration data from virtual router agent 216 (514). Network plugin 206 may obtain the interface configuration data with the interface type identifier from virtual router agent 216 by requesting the interface configuration data for the pod corresponding to the pod_uuid, and optionally <interface type>, included in the container specification data for pod 202A.

To create each of the virtual network interfaces 212 indicated in interface configuration data, network plugin 206 may cause an interface to be created in pod 202A by taking steps to insert the interface into the network namespace for pod 202A and request that other components (vRouter agent 216, SR-IOV switch, open vSwitch, etc.) add the interface to their forwarding/switching information (516). The interface configuration data in step 514 may include, e.g., MAC, DNS configuration, MTU, interface name, and vhost socket dir path and socket name for vhost control channel to DPDK application pod 202A. Network plugin 206 notifies virtual router agent 216 of the now-operational (by virtue of configuration by pod 202A) virtual network interfaces 212 (518). Virtual router agent 216 add the interface type to virtual router 220 (520). Pod 202A may be configured with a veth/vhost socket (522). In some examples, pod 202A may be configured with a SR-IOV interface that bypasses virtual router 220 and connects to a physical switch (see FIG. 6).

Network plugin 206 may also obtain (e.g., using a GET request) the virtual network addresses (e.g., IP address (IPv4/IPv6)) from the virtual router agent 216 (422) or by invoking an appropriate IPAM plugin, and configure the containers with the virtual network addresses for use in sending and receiving virtual network traffic.

Using network plugin 206 to generate an interface based on an interface type may allow network plugin 206 to support, for example, various 5G VNF use cases where a pod may need DPDK acceleration with a rich virtual router feature set or may want to use SR-IOV to send packets directly to a pod application—bypassing a virtual router. An example 5G virtualized network function (VNF) use case is illustrated in FIG. 6, where all pod interfaces are configured by a single network plugin 206.

Figure 6:
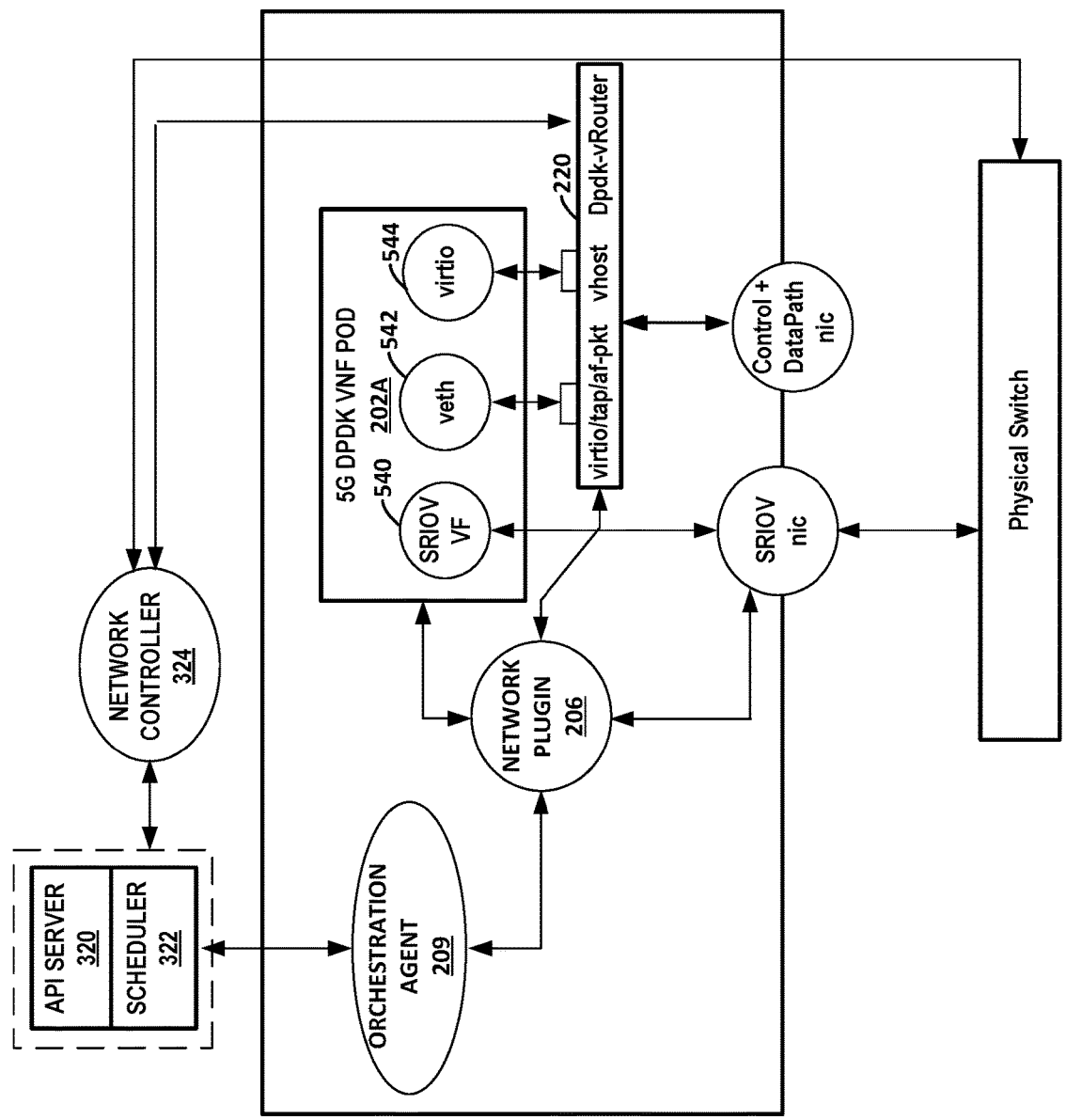
FIG. 6 is a block diagram illustrating an example creation of network virtual interfaces for a 5G virtualized network function (VNF) with data plane development kit (DPDK) acceleration using a CNI that supports multiple types of interfaces, according to techniques described in this disclosure.

FIG. 6 is a block diagram illustrating an example creation of network virtual interfaces for a 5G virtualized network function (VNF) with data plane development kit (DPDK) acceleration using a network plugin 206 that supports multiple types of interfaces, according to techniques described in this disclosure.

In the example of FIG. 6, a 5G DPDK accelerated VNF pod 202A can be viewed as an Open Distributed Unit (O-DU) application which may receive data from a Radio Unit (RU) via SR-IOV VF 540 bypassing virtual router 220 and sending data to the Open Centralized Unit (O-CU) using, with virtio interface 544, virtio-vhost communication via a dpdk vrouter of virtual router 220 utilizing all rich networking features. O-DU, 0-CU, and RU are defined according to Open Radio Access Network specifications. At the same time, pod 202A may use a veth interface 542 for management or control functionality. Network plugin 206 may support all types of interfaces and the example of FIG. 6 shows only veth, SR-IOV, and DPDK for example purposes. However, network plugin 206 may support fewer or additional interfaces, such as, for example, virtual sub interfaces, macvlan, PTP, or other interfaces.

In the example of FIG. 6, all different interfaces may be assigned IP addresses from a same IPAM using the same network attachment definition (e.g., a common network attachment definition). The network attachment definition may indicate an interface type and an IP address range for virtual network interfaces of a pod. The following may represent an example common network attachment definition.

```
apiVersion: "k8s.cni.cncf.io/v1"
kind: NetworkAttachmentDefinition
metadata:
    name: network-a
    annotations:
        juniper.net/networks: '{
            "ipamV4Subnet": "172.16.70.0/24",
            "routeTargetList": ["target:23:4561"],
            "importRouteTargetList": ["target:2.2.2.2:561"],
            "exportRouteTargetList": ["target:1.1.1.1:561"]
        }'
spec:
    config: '{
        "cniVersion": "0.3.0",
        "type": "contrail-k8s-cni"
    }'
```

A sample network selection annotation in a pod manifest (with YAML) is as follows.

```
apiVersion: v1
kind: Pod
metadata:
    name: contrail-multinic-pod
    annotations:
        k8s.v1.cni.cncf.io/networks: '[
            {
                "name" : "network-a",
                "cni-args": {
                    "interfacetype": "virtio"
                }
            },
            {
                "name" : "network-b",
                "cni-args": {
                    "interfacetype": "veth"
                }
            },
            {
                "name" : "network-c",
                "cni-args": {
                    "interfacetype": "sriov"
                }
            }
        ]'
```

In the above example, "interfacetype" may define a type of interface. For instance, veth, sriov, or virtio. In this example, network-a, network-b, and network-c each have a different interface. In some examples, different networks may have different types of interfaces. For example, the virtual network interface for the pod to communicate using virtual network "network-c" should be of interface type SR-IOV ("sriov"), while the virtual network interface for the pod to communicate using virtual network "network-b" should be of interface type veth ("veth").

Orchestrator 23 may obtain the above pod manifest that includes an annotation indicating an interface type for a virtual network for pod 22A and deploy pod 22A to a host computing device. In this example, orchestrator 23 may store pod configuration data (e.g., the above pod manifest) for pod 22A. The pod configuration data may include the interface type for the virtual network for the pod.

When SRIOV interface 510 is mapped to pod 202A, packets sent out on SRIOV interface 510 may not get encapsulated. On the other hand packets that are sent over a DPDK interface or Kernel mode virtual router interface (e.g., veth interface 542 or virtio interface 544) may be encapsulated using a packet forwarding plane of virtual router 220.

On the receiving side, the compute node has virtual router that expects an encapsulation in order to forward the packet to the correct pod interface. As such, system 700 may provide encapsulation irrespective of from which interface packets were sent.

In accordance with the techniques of the disclosure, whenever SRIOV interface 510 is to be made available to pod 202A, network controller manager 325 may listen to scheduler 322 to find out the compute node that is scheduled to run pod 202A.

For underlay programming, Contrail supports virtual-port groups which can be created from a contrail UI. Virtual port-groups create interface pairing between switch interface and virtual router interface. Underlay switches can be programmed accordingly in an automated way based on virtual port group configuration. Whenever a packet is sent on SRIOV interface 510, encapsulation is provided by the underlying switch, which may allow for pod 202A to run different type network interface cards (e.g., SRIOV NIC or Control+DataPath NIC) to communicate with different types of interfaces using a same subnet. For example a DPDK NIC in pod 202 may communicate with pod 202A with an sriov interface 510. This approach may also work for a flat network configuration available in contrail.

Figure 7:
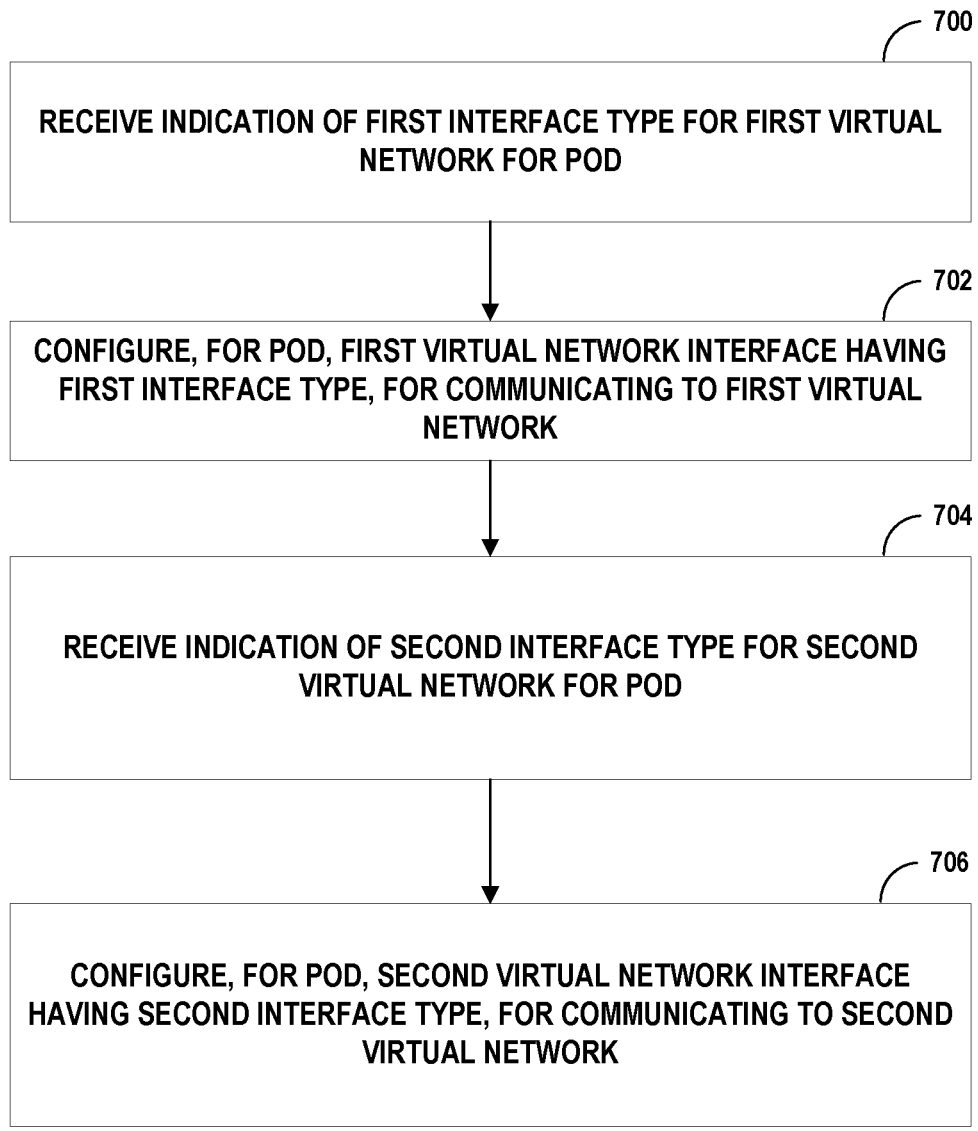
FIG. 7 is a flow diagram illustrating an example process for creating network virtual interfaces using a CNI that supports multiple types of interfaces, according to techniques described in this disclosure.

FIG. 7 is a flow diagram illustrating an example process for creating network virtual interfaces using a CNI that supports multiple types of interfaces, according to techniques described in this disclosure. FIG. 7 is described with respect to FIGS. 1-6 for example purposes only.

Network plugin 206 may receive, from virtual router agent 216, an indication of a first interface type for a virtual network for pod 202A (702). Network plugin 206 may configure, for pod 202A, a first virtual network interface having the interface type, the virtual network interface for communicating on the virtual network (704). For instance, network plugin 206 may configure SRIOV VF 540.

Network plugin 206 may receive, from virtual router agent 216, an indication of a second interface type for a second virtual network (706). Network plugin 206 may configure, for pod 202A, a second virtual network interface having the second interface type, the second virtual network interface for communicating on the second virtual network (708). The first interface type and the second interface type may be different. For instance, network plugin 206 may configure veth 542.

In some examples, network plugin 206 may receive, from virtual router agent 216, an indication of a first IP address for the first virtual network interface and output, the indication of the first IP address to pod 202A. Similarly, network plugin 206 may receive, from virtual router agent 216, an indication of a second IP address for the second virtual network interface, wherein the second IP address is different from the first IP address, and output, the indication of the second IP address to pod 202A. In some examples, the first IP address is assigned to be within a subnet range indicated in a network attachment definition and the second IP address is assigned to be within the subnet range indicated in the network attachment definition. For example, network plugin 206 may assign both the first IP address and the second IP address to be within a subnet range indicated in a common network attachment definition.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
   a virtual router comprising a virtual router agent, the virtual router implemented with first processing circuitry;
   a pod comprising a container; and
   a network plugin implemented with second processing circuitry and configured to:
      receive, from the virtual router agent, an indication of a first interface type for a first virtual network for the pod;
      configure, for the pod, a first virtual network interface having the first interface type, the first virtual network interface for communicating on the first virtual network;
      receive, from the virtual router agent, an indication of a second interface type for a second virtual network; and
      configure, for the pod, a second virtual network interface having the second interface type, the second virtual network interface for communicating on the second virtual network, wherein the first interface type is different from the second interface type, and wherein the first interface type comprises one of veth, single root I/O virtualization (SR-IOV), or virtio.

2. The system of claim 1, wherein the network plugin comprises a container networking interface for a container orchestration platform.

3. The system of claim 2, wherein the container orchestration platform comprises a Kubernetes platform.

4. The system of claim 1, wherein the second virtual network interface is for a workload that executes a containerized routing protocol daemon.

5. The system of claim 1, wherein the network plugin is further configured to:
   receive, from the virtual router agent, an indication of a first virtual network address for the first virtual network interface;
   configure the first virtual network interface of the pod with the first virtual network address;
   receive, from the virtual router agent, an indication of a second virtual network address for the second virtual network interface, wherein the second virtual network address is different from the first virtual network address; and
   configure the second virtual network interface of the pod with the second virtual network address.

6. The system of claim 5, wherein the network plugin is further configured to assign both the first virtual network address and the second virtual network address from a subnet indicated in a common network attachment definition.

7. The system of claim 1, wherein the network plugin is further configured to:
   receive, from the virtual router agent, an indication of a virtual network address for the first virtual network interface; and
   configure the first virtual network interface of the pod with the virtual network address.

8. A method comprising:
   receiving, by a network plugin and from a virtual router agent of a virtual router, an indication of a first interface type for a first virtual network for a pod, the virtual router implemented with first processing circuitry and the network plugin implemented with second processing circuitry;

configuring, by the network plugin, for the pod, a first virtual network interface having the first interface type, the first virtual network interface for communicating on the first virtual network;

receiving, by the network plugin and from the virtual router agent, an indication of a second interface type for a second virtual network; and configuring, by the network plugin, for the pod, a second virtual network interface having the second interface type, the second virtual network interface for communicating on the second virtual network, wherein the first interface type is different from the second interface type and the first interface type comprises one of veth, single root I/O virtualization (SR-IOV), or virtio.

9. The method of claim 8, wherein the network plugin comprises a container networking interface for a container orchestration platform.

10. The method of claim 9, wherein the container orchestration platform comprises a Kubernetes platform.

11. The method of claim 8, wherein the second virtual network interface is for a workload that executes a containerized routing protocol daemon.

12. The method of claim 8, further comprising:
receiving, by the network plugin and from the virtual router agent, an indication of a first virtual network address for the first virtual network interface;
configuring, by the network plugin, the first virtual network interface of the pod with the first virtual network address;
receiving, by the network plugin and from the virtual router agent, an indication of a second virtual network address for the second virtual network interface, wherein the second virtual network address is different from the first virtual network address; and
configuring, by the network plugin, the second virtual network interface of the pod with the second virtual network address.

13. The method of claim 12, further comprising assigning both the first virtual network address and the second virtual network address from a subnet indicated in a common network attachment definition.

14. The method of claim 8, further comprising:
receiving, by the network plugin and from the virtual router agent, an indication of a virtual network address for the first virtual network interface; and
configuring, by the network plugin, the first virtual network interface of the pod with the virtual network address.

15. Non-transitory computer-readable storage media storing executable instructions that, when executed by processing circuitry, cause the processing circuitry to:

receive, from a virtual router comprising a virtual router agent, an indication of a first interface type for a first virtual network for a pod, the pod comprising a container;

configure, for the pod, a first virtual network interface having the first interface type, the first virtual network interface for communicating on the first virtual network;

receive, from the virtual router agent, an indication of a second interface type for a second virtual network; and configure, for the pod, a second virtual network interface having the second interface type, the second virtual network interface for communicating on the second virtual network, wherein the first interface type is different from the second interface type, and wherein the first interface type comprises one of veth, single root I/O virtualization (SR-IOV), or virtio.

16. The non-transitory computer-readable storage media of claim 15, wherein the instructions implement a network plugin, the network plugin comprising a container networking interface for a container orchestration platform.

17. The non-transitory computer-readable storage media of claim 16, wherein the container orchestration platform comprises a Kubernetes platform.

18. The non-transitory computer-readable storage media of claim 15, wherein the second virtual network interface is for a workload that executes a containerized routing protocol daemon.

19. The non-transitory computer-readable storage media of claim 15, wherein the instructions further cause the processing circuitry to:
receive, from the virtual router agent, an indication of a first virtual network address for the first virtual network interface;
configure the first virtual network interface of the pod with the first virtual network address;
receive, from the virtual router agent, an indication of a second virtual network address for the second virtual network interface, wherein the second virtual network address is different from the first virtual network address; and
configure the second virtual network interface of the pod with the second virtual network address.

20. The non-transitory computer-readable storage media of claim 19, wherein the instructions further cause the processing circuitry to assign both the first virtual network address and the second virtual network address from a subnet indicated in a common network attachment definition.

* * * * *